T. A. KILLMAN.
MOTION PICTURE APPARATUS.
APPLICATION FILED JAN. 4, 1915.
1,324,122.
Patented Dec. 9, 1919.
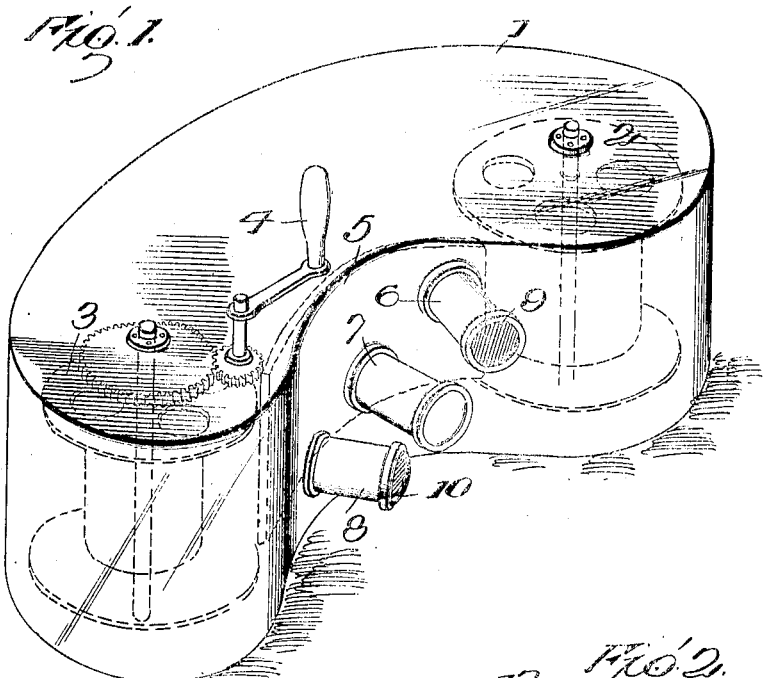
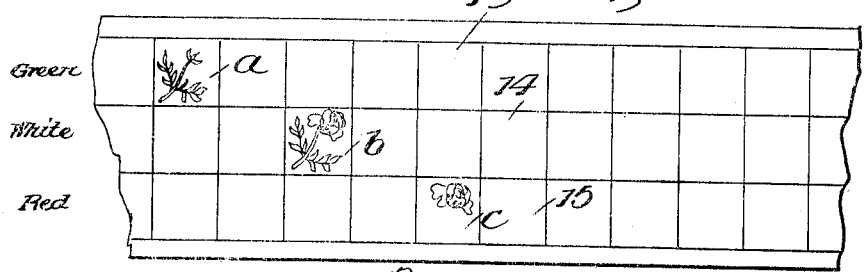
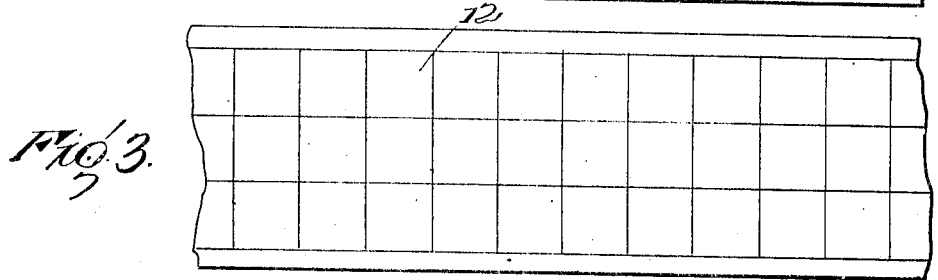
Inventor
T. A. Killman
Witnesses

UNITED STATES PATENT OFFICE.

THOMAS A. KILLMAN, OF NASHVILLE, TENNESSEE, ASSIGNOR, BY DIRECT AND MESNE ASSIGNMENTS, TO INTERNATIONAL MOVING PICTURE AND FILM COMPANY, OF NASHVILLE, TENNESSEE, A CORPORATION OF TENNESSEE.

MOTION-PICTURE APPARATUS.

1,324,122.  Specification of Letters Patent.  Patented Dec. 9, 1919.

Application filed January 4, 1915. Serial No. 458.

*To all whom it may concern:*

Be it known that I, THOMAS A. KILLMAN, a citizen of the United States, residing at Nashville, in the county of Davidson and State of Tennessee, have invented certain new and useful Improvements in Motion-Picture Apparatus, of which the following is a specification.

This invention relates to a method of photographing and reproducing by projection motion pictures in the natural colors of the objects photographed.

Various methods have been proposed for satisfactorily accomplishing this result, but so far as I am aware, all have possessed either or both of two serious defects. In certain of the proposed methods, two or more color screens are employed in connection with the projecting apparatus and the film used carries twice or three times the ordinary number of picture fields for each subject, as the case may be. The negative film is of course coated with panchromatic emulsion and the photographic exposure is made through two or more color screens. Where, for example, red and green screens are employed, successive portions of the film will be exposed alternately through the screens in photographing the subject. In projecting through a positive film printed from such a negative film it is necessary, in order to secure the proper blending of the colors upon the screen and the proper appearance of animation, that during every two periods of illumination of the screen, two picture portions or fields must be brought before the lens and this must be accomplished at a rate of speed sufficiently high to enable the eye to retain by persistence of vision an impression of both of such picture fields. During the following period of obliteration, both the bichromatic projection film and the shutter must be moved approximately twice as fast as ordinarily, and in trichromatic projection, three times as fast. It is very difficult, however, for the eye to retain by persistence of vision two or three color impressions to such an extent as to create the sensation of having seen all of the impressions simultaneously. This constitutes one of the defects mentioned.

If the desired effect, so far as color is concerned, is to be attained, the natural colors of the objects photographed must be accurately portrayed and failure to accomplish this constitutes the second defect mentioned. If, for example, in bichromatic projection, the two primary colors employed are red and green, the white or brilliant objects will appear upon the screen with a dull yellowish tint, due to the equal blending of the two primary colors. Even the use of a third color screen, as for example, one of blue, will not satisfactorily rectify the defect. It is of course desirable that all white or brilliant objects photographed and thrown upon the screen shall be white.

In consideration of the foregoing, it is one aim of the invention to disclose a method of photographing and reproducing by projection motion pictures in the natural colors of the objects photographed, which method contemplates the simultaneous projection upon the screen of all of the picture fields constituting any one group, so that it will not be necessary for the eye to be placed under the strain of retaining by persistence of vision first one and then another color impression.

The method further contemplates the projection of the pictures from the film in such manner that the shutter and the film of the projection apparatus will not be required to move faster than ordinarily. It has been determined by experiment that the best results are to be secured when the periods of illumination occur at the rate of about 16 per second. Therefore, by providing for the simultaneous projection of the several picture fields of each group throughout the length of the film I am enabled to maintain the standard shutter speed.

Another aim of the invention is to disclose a method of color projection in which the white and brilliant objects will appear in a natural manner upon the screen and without any appreciable yellowish tint.

Another aim of the invention is to provide a novel film especially constructed and prepared to accomplish the results before mentioned.

It is another object of the invention to disclose a method whereby motion pictures may be photographed stereoscopically and in a similar manner projected.

In the accompanying drawings:

Figure 1 is a perspective view, illustrating in a very general manner an instrument which may either be a motion picture camera or a part of the projection apparatus.

Fig. 2 is a diagrammatic view, illustrating a fragment of the positive film prepared in accordance with the principles of the present invention.

Fig. 3 is a similar view of the sensitive film or of the positive film before printing.

Corresponding and like parts are referred to in the following description and indicated in all the views of the accompanying drawings by the same reference characters.

Inasmuch as the principles of the invention may be involved in various constructions of a camera and likewise of a projection apparatus, the illustration of the camera in Fig. 1 of the drawings is very general in character and is only intended to illustrate one manner in which the desired result may be secured.

The camera shown in a general manner in Fig. 1 is adapted for use in the stereoscopic photographing of objects, and consists of a casing 1 which may be of the form here shown or of any other desired form, and within this casing are mounted film reels 2 and 3, the latter of which is the take-up reel and is rotated through the medium of a crank handle 4, or by any other suitable means. The film passes from the reel 2 between the front wall of the casing 1 and a correspondingly curved backing plate 5, and in its travel passes apertures in the said wall through each of which apertures there extends a lens box or mounting. These lens boxes are indicated one by the numeral 6, another by the numeral 7, and the third by the numeral 8, and the lens box 6 is located near the top of the casing, the box 8 near the bottom thereof, and the box 7 in an intermediate position, both as regards the top and bottom of the casing and the boxes 6 and 8. In other words, the boxes are arranged in an inclined series and they project radially with respect to the curved forward wall of the casing upon which they are mounted, and, furthermore, are so positioned that the optical axes of the lenses mounted therein will correspondingly converge toward a common focal point. It will be understood that the film is advanced in the usual step by step manner now employed, which of the ordinary means is actuated through the rotation of the handle 4. The lens within the box 7 is unscreened but a color filter or screen is fitted to the end of each of the boxes 6 and 8 and for convenience in describing the invention it will be assumed that the box 6 is provided with a green color screen 9 and that the box 8 is provided with a red color screen 10.

The film above referred to is indicated in general by the numeral 11 and in Figs. 2 and 3 of the drawings the various exposure or picture fields are indicated by intersecting longitudinal and transverse lines, the fields being indicated at 12. It will of course be understood that this showing is merely diagrammatic and that the film in reality is free from any picture or exposure field indications. However, in the completed positive film, there will be three distinct series of picture fields, one series indicated at 13, another at 14, and the third at 15, and it will be observed that these series of fields extend parallel to each other and longitudinally of the film. For convenience in further describing the invention, one field of the series 13 is indicated by the letter *a*, one field of the series 14 by the letter *b*, and one field of the series 15 by the letter *c*.

The method of taking and finally projecting motion pictures in their natural colors will now be described. The negative film shown in Fig. 3 is of course coated with a panchromatic emulsion. It is placed within the motion picture camera and the exposures are then made in the ordinary manner. As the film passes the lens tubes 6, 7 and 8, it will of course receive photographic impressions, and there will be three series of such impressions, one series being received through the green color screen 9 and the associated lens, another series through the lens within the box 7, and a third series through the red color screen 10 and the associated lens within the lens box 8, and it will be understood that in the negative film thus exposed, the three series will, in the order mentioned, correspond in location to the series 13, 14 and 15 of the picture fields in the completed positive film. Owing to the nature of the sensitized negative film, it will be understood that the series of impressions made through the lens within the lens box 7 will represent a true photographic image of the objects in focus, whereas the impressions made by the exposure of the film through the color screens 9 and 10 and their associated lenses will represent respectively such portions of the objects or general view as are naturally green and red in color or respectively similarly tinted. After the negative film has been removed from the camera, it is properly developed and subsequently printed from onto the positive film, this latter film being of the ordinary type employed in motion picture projection apparatus.

In order that the nature of the invention may be more readily understood, the positive film shown in Fig. 2 of the drawings represents a positive print of an object, one portion of which is green and the other portion red, the particular object illustrated being a flower and its stem. By reference to the said Fig. 2, it will be observed that the object in its entirety is depicted within the picture field $b$. In the picture field $a$, however, only the stem and leaves appear, and in the picture field $c$ only the bloom itself appears. It will thus be seen that only that portion of the object which is red appears in the picture field $c$, this portion constituting an impression received through the lens provided with the red screen, and in a like manner, it will be apparent that only that portion of the object which is green in color is shown in the picture field $a$, and corresponds to the impression received upon the negative film through the lens provided with the green screen. It will also be apparent by reference to the said Fig. 2 that the picture fields $a$, $b$ and $c$ are arranged in stepped relation or, in other words, in a series diagonally of the film. That is to say, that if the object were an animated one the composition of the fields $a$ and $c$ would exactly register with the field $b$, and in a like manner further on in the length of the film, the other correspondingly positioned fields $a$ and $c$ would by composition produce the correspondingly positioned field $b$.

In reproducing photographed objects in their natural colors, the positive film shown in Fig. 2 is arranged within a projection apparatus, in which the lens boxes containing the condensing and projecting lenses are arranged in substantially the same manner as in the instance of the camera shown in Fig. 1, and also in the instance of the projection apparatus, the lens boxes, corresponding to the boxes 6 and 8, are provided with color screens corresponding to the screens 9 and 10. Of course, the positive film is so positioned within the projection apparatus that the series of picture fields 13 which travel past the lens box, corresponding to the one indicated at 6 in Fig. 1, and the picture fields 14 and 15 will travel respectively past the lens boxes corresponding to the boxes 7 and 8 in the said figure. As before stated, the positive film is of the ordinary kind and consequently when developed and fixed the images in the various picture fields will appear opaque or semi-opaque. As a consequence, the images within the picture fields of the series 14 will be projected upon the screen in black and white as in the ordinary projection apparatus. The images within the picture fields 13 and 15, however, will be projected upon the screen respectively in green and white and red and white. These two colors will of course blend upon the screen and, depending upon the various tints or densities of the picture fields 14 and 15, will truly represent the natural colors of the objects photographed. As before stated, the equal blending of the primary colors red and green will produce a dull yellow, but inasmuch as the white and brilliant objects in the picture are represented by transparent portions of the fields 14, these objects will appear upon the screen in a natural manner, as the white light more or less effectively destroys the yellow tint.

From the foregoing, it will be apparent that the film when placed within the projection apparatus need be advanced only at the same rate of speed as the ordinary film and yet the three related fields $a$, $b$ and $c$ of the series 13, 14 and 15 will be simultaneously displayed upon the screen.

Having thus described the invention, what is claimed as new is:

1. That method of projecting a picture in the natural colors of the subject photographed which consists in projecting from distinct but related portions of a film, one of which portions represents those portions of the subject having colors or tints of one kind, and another of which portions represents those portions of the subject having colors or tints of complementary kind, the projection of the said portions being through the complementary color media, and the projection from another portion of the film, related to the first mentioned portions, being through the medium of white light.

2. That method of producing a picture in the natural colors of the subject photographed which consists in simultaneously projecting from distinct but related portions of a film, one of which portions represents those portions of the subject having colors or tints of one kind, and another of which portions represents those portions of the subject having colors or tints of complementary kind, the projection of said portions being through complementary color media, and the projection from another portion of the film, related to the first mentioned portion, being through the medium of white light.

3. A film for the projection of motion pictures in colors having a plurality of series of picture fields, related and corresponding fields of the several series being adapted for simultaneous projection, the fields of certain of the series containing incomplete representations of the image to be projected and representing exposures through complementary color media and the fields of another one of the series containing complete representations of the image to be projected and representing exposures to white light, the projection of the first mentioned fields being designed to be through primary color media and the fields of the last mentioned series being designed for projection through white light media, the associated and related fields of the several series being arranged to have the images thereon projected in registration during each period of projection.

4. The process of producing moving pictures in colors from a film having successive portions made up of a section of black and white quality and other sections of color-separated quality, which consists in projecting the color-separated sections with the aid of suitable color filters and projecting the black and white sections directly without a color filter.

In testimony whereof I affix my signature in presence of two witnesses.

THOMAS A. KILLMAN. [L. S.]

Witnesses:
   EDWARD H. ROY,
   ROBERT McEWEN.